United States Patent
Myers et al.

(10) Patent No.: US 11,181,058 B2
(45) Date of Patent: Nov. 23, 2021

(54) METHOD FOR MEASURING EXHAUST GAS RECIRCULATION FLOW IN AN ENGINE SYSTEM, CONTROLLING EMISSIONS IN AN ENGINE SYSTEM, AND AN ENGINE SYSTEM

(71) Applicants: VOLVO TRUCK CORPORATION, Gothenburg (SE); Adam Myers, Hagerstown, MD (US); Russell King, Williamsport, MD (US); Jan Wiman, Hagerstown, MD (US); Georgios Angelidis, Kalamazoo, MI (US)

(72) Inventors: Adam Myers, Hagerstown, MD (US); Russell King, Williamsport, MD (US); Jan Wiman, Hagerstown, MD (US); Georgios Angelidis, Kalamazoo, MI (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/627,312

(22) PCT Filed: Sep. 23, 2017

(86) PCT No.: PCT/US2017/053120
§ 371 (c)(1),
(2) Date: Dec. 29, 2019

(87) PCT Pub. No.: WO2019/059935
PCT Pub. Date: Mar. 28, 2019

(65) Prior Publication Data
US 2020/0208583 A1   Jul. 2, 2020

(51) Int. Cl.
*F02D 41/00* (2006.01)
*F02M 26/06* (2016.01)
(Continued)

(52) U.S. Cl.
CPC ..... *F02D 41/0072* (2013.01); *F02D 41/0077* (2013.01); *F02M 26/06* (2016.02);
(Continued)

(58) Field of Classification Search
CPC ............. F02D 41/0072; F02D 41/0077; F02D 41/1445; F02D 41/0007; F02D 2200/0402;
(Continued)

(56) References Cited

U.S. PATENT DOCUMENTS

| 6,378,515 B1 * | 4/2002 | Geyer ..................... F02D 21/08 |
| | | 123/683 |
| 7,957,886 B2 | 6/2011 | Eiraku et al. |

(Continued)

FOREIGN PATENT DOCUMENTS

| CN | 103114916 A | 5/2013 |
| CN | 105626275 A | 6/2016 |

(Continued)

OTHER PUBLICATIONS

International Search Report (dated Dec. 20, 2017) for corresponding International App. PCT/US2017/053120.
(Continued)

*Primary Examiner* — Phutthiwat Wongwian
*Assistant Examiner* — Sherman D Manley
(74) *Attorney, Agent, or Firm* — WRB-IP LLP

(57) ABSTRACT

A method is provided for measuring exhaust gas recirculation (EGR) flow in. an engine system wherein turbo speed of a turbocharger, inlet pressure upstream of a compressor, boost pressure upstream of an engine, and engine intake temperature upstream of the engine are measured. Air mass flow into the engine system is calculated as a function of the turbo speed, inlet pressure, and boost pressure, exhaust mass flow is calculated as a function of the boost pressure, the
(Continued)

engine intake temperature, volumetric efficiency of the engine, and engine size, and EGR flow is determined, by subtracting air mass flow from exhaust mass flow. A method for controlling emissions from an engine system, and an engine system are also provided.

15 Claims, 2 Drawing Sheets

(51) Int. Cl.
*F02M 35/10* (2006.01)
*F02M 35/104* (2006.01)
*G01L 19/00* (2006.01)
*G01P 3/00* (2006.01)

(52) U.S. Cl.
CPC ...... *F02M 35/104* (2013.01); *F02M 35/1038* (2013.01); *G01L 19/0092* (2013.01); *G01P 3/00* (2013.01); *F02D 2200/0414* (2013.01)

(58) Field of Classification Search
CPC ..... F02D 2200/0406; F02D 2200/0411; F02M 26/06; F02M 26/05; F02M 35/104; F02M 35/1038; G01L 19/0092; G01P 3/00; Y02T 10/12; Y02T 10/40
See application file for complete search history.

(56) References Cited

U.S. PATENT DOCUMENTS

| | | | | |
|---|---|---|---|---|
| 9,702,297 | B2* | 7/2017 | Henry | F02D 41/144 |
| 2002/0100463 | A1 | 8/2002 | Jaliwala et al. | |
| 2005/0172627 | A1* | 8/2005 | Baize | F02D 23/00 |
| | | | | 60/602 |
| 2007/0209362 | A1* | 9/2007 | Sun | F02D 23/02 |
| | | | | 60/602 |
| 2008/0162018 | A1* | 7/2008 | Dea | F02M 26/33 |
| | | | | 701/108 |
| 2011/0257052 | A1 | 10/2011 | Motz et al. | |
| 2012/0325188 | A1* | 12/2012 | Auckenthaler | F02D 41/2451 |
| | | | | 123/568.21 |
| 2014/0047834 | A1* | 2/2014 | Polkus | F02D 41/10 |
| | | | | 60/602 |
| 2014/0067228 | A1 | 3/2014 | Polkus et al. | |
| 2015/0060506 | A1 | 3/2015 | Cameron et al. | |
| 2019/0218986 | A1* | 7/2019 | Yamaguchi | F02D 41/0275 |
| 2019/0218992 | A1* | 7/2019 | Yamaguchi | F02M 26/15 |
| 2019/0277188 | A1* | 9/2019 | Zeng | F02D 41/0072 |
| 2020/0025050 | A1* | 1/2020 | Chen | F01N 13/009 |
| 2020/0033229 | A1* | 1/2020 | Nakano | G01M 15/04 |
| 2020/0378781 | A1* | 12/2020 | Kantarjiev | G01C 21/32 |

FOREIGN PATENT DOCUMENTS

| | | |
|---|---|---|
| CN | 106438021 A | 2/2017 |
| DE | 102009027137 A1 | 12/2010 |
| DE | 102011087260 A1 | 5/2013 |
| FR | 2990472 A1 | 11/2013 |
| WO | 2004027244 A1 | 4/2004 |

OTHER PUBLICATIONS

European Search Report (dated Mar. 19, 2021) for corresponding European App. EP 17 92 5590.

Moraal P et al: "Turbocharger Modeling for Automotive Control Applications", SAE Technicaly Paper Series, SAE, US, vol. 1999-01-0988, Mar. 1, 1999 (Mar. 1, 1999), pp. 1-14, XP002491228. ~ISSN.0148-7191 * pp. 1,4,5,6 *.

Chinese Official Action (dated Sep. 31, 2021) for corresponding Chinese App. 201780092581.8.

Yu, Principle, Structure and Use of a Turbocharger, National Defense Industry Press (Apr. 30, 1985).

Zhanjiang Fisheries College. Machinery of Fishing Vessel (May 1, 1983).

* cited by examiner

METHOD FOR MEASURING EXHAUST GAS RECIRCULATION FLOW IN AN ENGINE SYSTEM, CONTROLLING EMISSIONS IN AN ENGINE SYSTEM, AND AN ENGINE SYSTEM

BACKGROUND AND SUMMARY

The present invention relates generally to use of exhaust gas recirculation (EGR) in engine systems and, more particularly, to methods and apparatus for determining and adjusting EGR flow in such engine systems.

In internal combustion engines such as diesel engines, it is desirable to minimize emissions such as NOx emissions, such as to comply with various regulations. NOx emissions tend to increase to unacceptable levels at higher combustion chamber temperatures. It is known to recirculate a limited amount of exhaust gas from the engine and introduce it into the intake line upstream of the engine to dilute incoming oxygen to produce lower combustion chamber temperatures.

To control the amount of EGR gas provided, some technique for measuring the amount of gas flowing through the EGR fine is needed. This information can be used to control the amount of EGR flow and to adjust various actuators and fuel injectors on the engine to, e.g., meet engine out emissions regulations. Techniques for directly measuring EGR flow include use of an orifice plate or a lambda sensor.

There are various problems associated with such direct measurement techniques for determining EGR flow. The measuring equipment adds cost to the system, equipment such as a venturi tends to clog over time, and equipment such as a delta P sensor can be unreliable. Additionally, such direct measurement techniques tend to impose a restriction on the EGR circuit and can result in diminished fuel economy.

It is desirable to provide a method for measuring exhaust gas recirculation flow in an engine system that adds minimal cost to the system, is not prone to malfunction, and is reliable.

In accordance with an aspect of the present invention, a method is provided for measuring exhaust gas recirculation (EGR) flow in an engine system, the engine system comprising an engine, a turbocharger, the turbocharger including a compressor in an intake line upstream of the engine, an EGR line connected between an exhaust line downstream of the engine and the intake line upstream of the engine and downstream of the compressor. The method comprises measuring turbo speed of the turbocharger, measuring inlet pressure upstream of the compressor, measuring boost pressure upstream of the engine, and measuring engine intake temperature upstream of the engine. Air mass flow into the engine system is calculated as a function of the turbo speed, inlet pressure, and boost pressure, exhaust mass flow is calculated as a function of the boost pressure, the engine intake temperature, volumetric efficiency of the engine, and engine size, and EGR flow is determined by subtracting air mass flow from exhaust mass flow.

In accordance with another aspect of the present invention, a method is provided for controlling emissions from an engine system, the engine system comprising an engine, a turbocharger, the turbocharger including a compressor in an intake line upstream of the engine, era exhaust gas recirculation (EGR) line connected between an exhaust line downstream of the engine and the intake line upstream of the engine and downstream of the compressor. The method comprises measuring emissions from the engine system, determining EGR flow in the EGR line by measuring turbo speed of the turbocharger, measuring inlet pressure upstream of the compressor, measuring boost pressure upstream of the engine, measuring engine intake temperature upstream of the engine, calculating air mass flow into the engine system as a function of the turbo speed, inlet pressure, and boost pressure, calculating exhaust mass flow as a function of the boost pressure, the engine intake temperature, volumetric efficiency of the engine, and engine size, and determining EGR flow by subtracting air mass flow from exhaust mass flow; and adjusting EGR flow to adjust emissions in response to the measured emissions and the determined EGR flow.

In accordance with yet another aspect of the present invention, an engine system comprises an engine, a turbocharger, the turbocharger including a compressor in an intake line upstream of the engine, an exhaust gas recirculation (EGR) line connected between an exhaust line downstream of the engine and the intake line upstream of the engine and downstream of the compressor, the EGR line including an EGR valve, a turbo speed sensor configured to measure turbo speed of the turbocharger, a pressure sensor configured to measure inlet pressure upstream of the compressor, a boost pressure sensor configured to measure pressure upstream of the engine, a temperature sensor configured to measure engine intake temperature upstream of the engine, and a controller configured to calculate air mass flow into the engine system as a function of the turbo speed, inlet pressure, and boost pressure, to calculate exhaust mass flow as a function of the boost pressure, the engine intake temperature, volumetric efficiency of the engine, and engine size, and to determine EGR flow by subtracting air mass flow from exhaust mass flow, and to control opening and closing of the EGR valve to obtain a desired level of EGR flow.

Because the method and engine system according to aspects of the present invention does not require direct measurement of EGR flow, it can be provided with minimal additional cost using equipment that is already present in the engine system. Additionally, such equipment can be less prone to malfunction and can be highly accurate. Equipment such as turbo speed sensors, for example, that can be used in connection with the present invention are known to be highly accurate and reliable.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
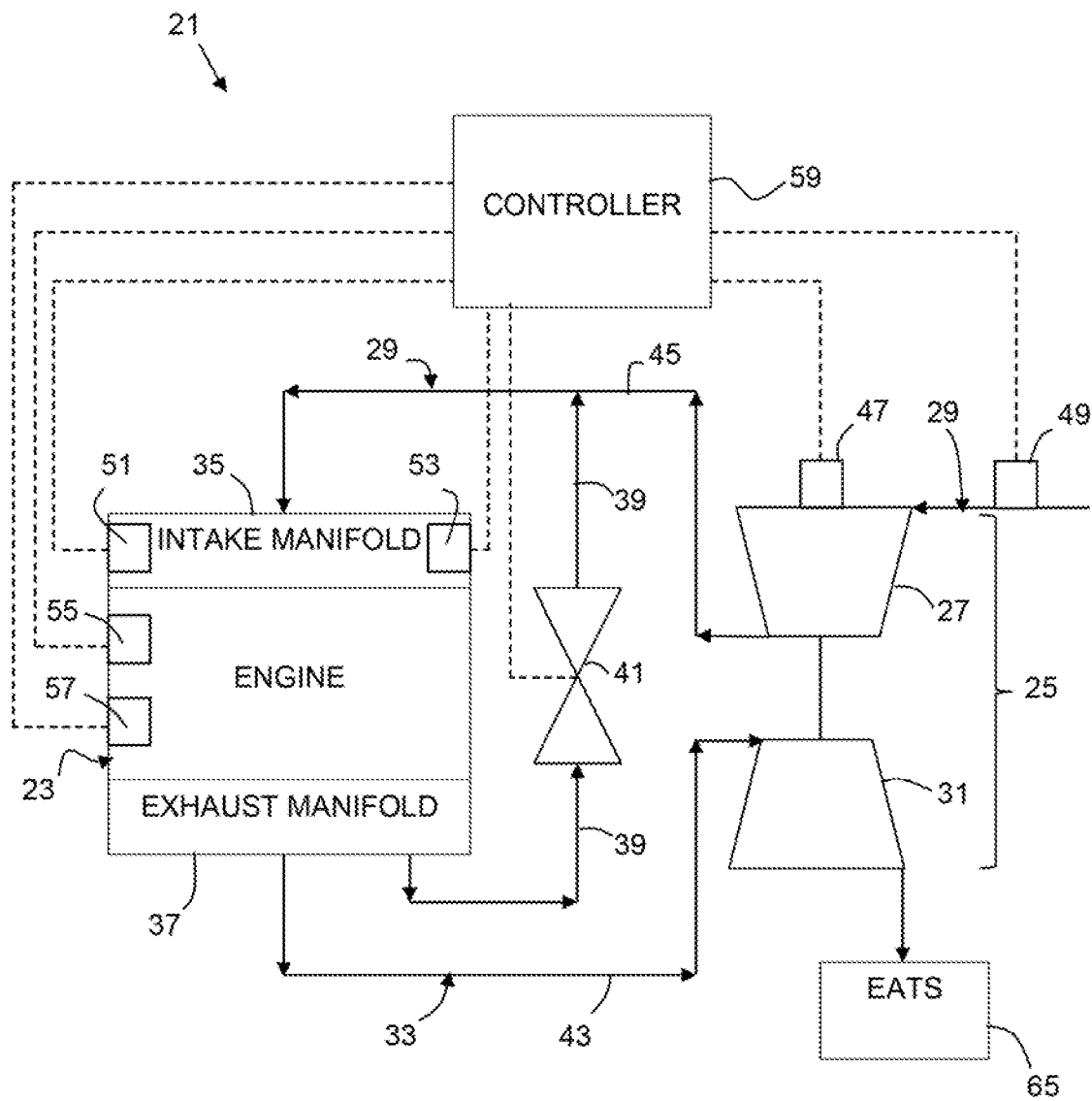
FIG. 1 is a schematic view of an engine system according to an aspect of the present invention.

An engine system 21 according to an aspect of the present invention is shown in FIG. 1 and comprises an engine 23 and a turbocharger 25, the turbocharger including a compressor 27 in an intake line 29 upstream of the engine and a turbine 31 in an exhaust line 33 downstream of the engine. The intake line 29 typically includes an intake manifold 35 and the exhaust line 33 typically includes an exhaust manifold 37. The engine 23 is typically a gasoline or diesel engine.

An exhaust gas recirculation (EGR) line 39 is connected between the exhaust line 33 downstream of the engine 23 and the intake line 29 upstream of the engine and downstream of the compressor 27. The EGR line 39 includes an EGR valve 41 and, typically, an EGR cooler (not shown). The EGR line 39 is shown in FIG. 1 as extending from the exhaust manifold 37 instead of a portion 43 of the exhaust line downstream of the exhaust manifold, however, it will be appreciated that the EGR line can extend from the exhaust line 33 at the exhaust manifold or at the downstream line 43. The EGR line 39 typically extends to the intake line 29 to a portion 45 of the intake line upstream of the intake manifold 35.

The engine system 21 further comprises a turbo speed sensor 47 configured to measure turbo speed of the turbocharger 25, a pressure sensor 49 configured to measure inlet pressure upstream of the compressor 27, a boost pressure sensor 51 configured to measure pressure upstream of the engine 23, typically in the intake manifold 35, and a temperature sensor 53 configured to measure engine intake temperature upstream of the engine, also typically in the intake manifold. The boost pressure sensor 51 and the temperature sensor 53 can be a single device or, as shown in FIG. 1, separate devices. An engine speed sensor 55 and an engine torque sensor 57 can be provided to measure a speed of the engine crankshaft (not shown) and torque transmitted by the crankshaft.

The engine system 21 further comprises a controller 59, such as an ECU, that is configured:
  to calculate air mass flow into the engine system as a function of the turbo speed, inlet pressure, and boost pressure,
  to calculate exhaust mass flow as a function of the boost pressure, the engine intake temperature, volumetric efficiency of the engine, and engine size, and
  to determine EGR flow by subtracting air mass flow from exhaust mass flow, and to control opening and closing of the EGR valve to obtain a desired level of EGR flow.

Exhaust mass flow for a given engine can be calculated by the controller 59 by any suitable technique, such as by the known equation:

$$\text{Engine Flow} = \frac{\text{Intake Pressure} * \text{Volumetric Efficiency} * \frac{\text{Engine Speed}}{2} * \text{Engine Size}}{\text{Intake Temperature}} \quad (1)$$

where
  Intake Pressure is the boost pressure in the intake manifold that can be measured by the boost pressure sensor 51,
  Intake Temperature is the temperature in the intake manifold measured by the temperature sensor 53 (that can also be measured by certain boost sensors),
  Volumetric Efficiency is measured during development of the engine using a test cell. This is put into a map in the controller (ECU) 59, and changes based on engine speed and torque,
  Engine Speed is measured using a speed sensor 55 at the crankshaft of the engine,
  Engine size is the displacement of the engine.

Figure 2:
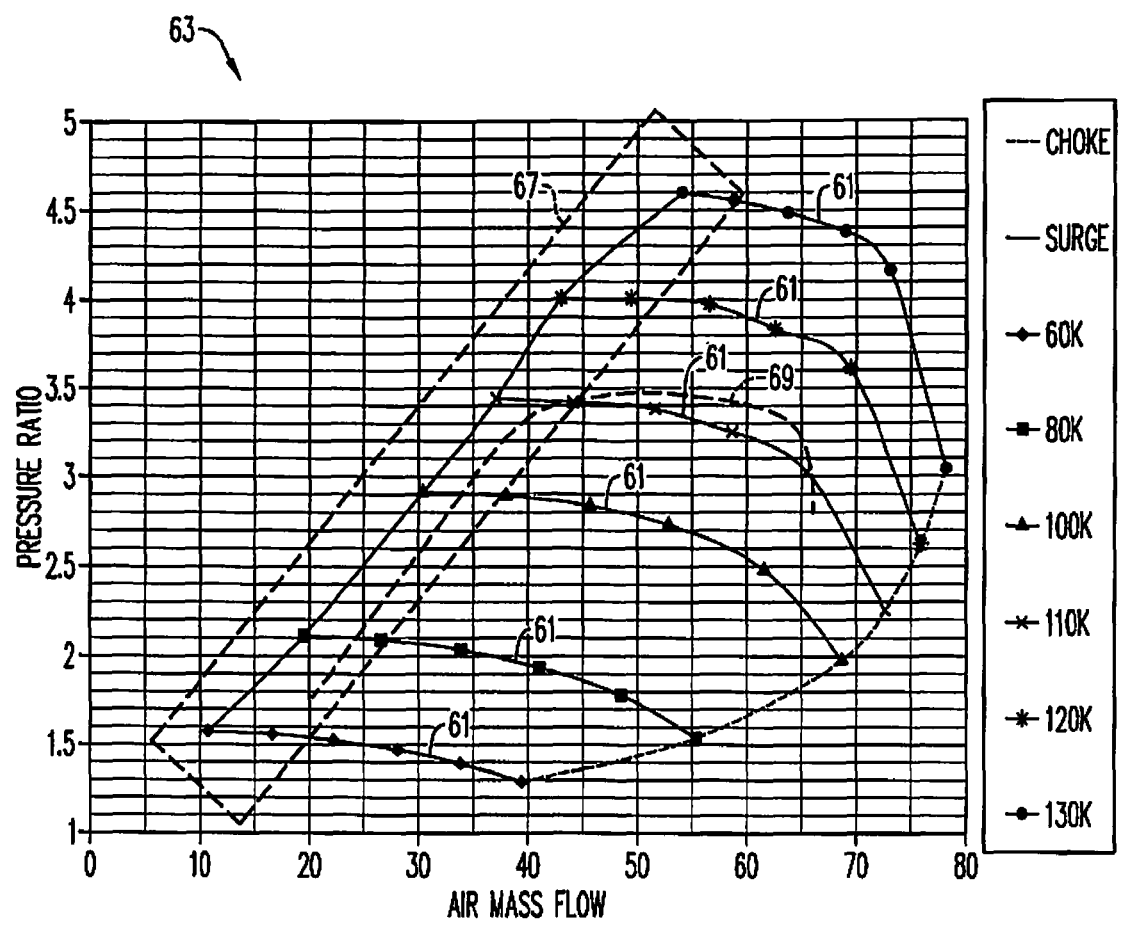
FIG. 2 is an illustrative compressor map plotting pressure ratio (boost pressure/compressor inlet pressure) versus air mass flow.

The controller 59 can be configured to calculate air mass flow using a compressor map (typically in the form of an algorithm) that plots pressure ratio of the inlet pressure and the boost pressure for the compressor (boost pressure/compressor inlet pressure) versus air mass flow as long as the slope of a turbo speed line 61 in the compressor map algorithm is equal to or exceeds a predetermined value, i.e. is further away from a slope of zero. The turbo speed lines 61 typically (but not always) have a negative slope, so references to the slope of the turbo speed line exceeding a predetermined value typically mean that the slope is a greater negative value. An illustrative compressor map 63 for the compressor map algorithm is shown in FIG. 2. A presently preferred predetermined value of the slope of the turbo speed line 61 is −0.001 (for that portion of the speed line that slopes down toward the right of the compressor map 63), however, it will be appreciated that that value might be smaller and is largely dependent on the capacity of the controller. At slopes below that predetermined value of the slope, i.e. where the slope of the turbo speed line 61 approaches more closely to zero, e.g., at a slope of −0.0009, it becomes increasingly difficult to determine what the air mass flow is at a given pressure ratio and turbo speed from normal compressor maps. References to the slope of the turbo speed line 61 being "less than" the predetermined value will be understood to mean that the slope of the turbo speed line is closer to zero than the predetermined value and, likewise, references to the slope of the turbo speed line being "greater than" the predetermine value will be understood to mean that the slope of the turbo speed line is further from zero than the predetermined value.

Where the slope of the turbo speed line 61 is below the predetermined value, i.e. approaches zero, the compressor 27 is typically operating close to the surge line. This region is illustrated in FIG. 2 as a zone 67 surrounded by a dashed line. Where the slope of the turbo speed line 61 is less than the predetermined value, e.g., less than −0.001, the controller 59 is configured to calculate air mass flow as a function of engine speed and torque via a map of airflows for given engine speeds and torques established by simulations and testing of the engine 23 under different conditions where, the engine was driven into conditions that put the air flow into the "surge region/flat line region" of the compressor map and airflow was measured using a flow meter. The airflow map for this surge region flat line region is, of course engine or engine-type specific.

As an alternative to determining whether to calculate air mass flow using the compressor map or by the surge region/flat line region air flow map based on whether the slope of the turbo speed line is above or below a predetermined value, the compressor map 63 shown in FIG. 2 that plots pressure ratio of the inlet pressure and the boost pressure for the compressor versus air mass flow can be used based on a "surge detect" algorithm that considers the compressor to be operating sufficiently distant from the surge line when at least one of (a) engine speed measured by the engine speed sensor 55 is greater than a predetermined value and (b) engine torque measured by the engine torque sensor 57 is less than a predetermined percentage of maximum allowable torque for the engine. This is another technique for determining whether the compressor is operating close to the surge line. By this surge detect algorithm, the controller 59 can be configured to calculate air mass flow as a function of engine speed and engine torque via the surge region/flat line region map when both (a) engine speed is less than or equal to a predetermined value and (b) engine torque is equal to or greater than a predetermined percentage of maximum allowable torque. To illustrate in a presently preferred embodiment, the controller 59 is configured to calculate air mass flow as a function of engine speed and engine torque via the surge region/flat line region map when both (a) engine speed is less than or equal to 1200 RPM and (b) engine torque is equal to greater than 98% of maximum allowable torque. The "full load torque curve" 69 of the airflow map of an illustrative surge region/flat line region map is shown as a dashed line superimposed on the compressor map 63 shown in FIG. 2.

A method for measuring exhaust gas recirculation (EGR) flow in the engine system 21 comprises
  measuring turbo speed of the turbocharger 27, e.g., with the turbo speed sensor 47,
  measuring inlet pressure upstream of the compressor 27, e.g., with the pressure sensor 49,
  measuring boost pressure upstream of the engine, e.g., with the boost pressure sensor 51, and
  measuring engine intake temperature upstream of the engine, e.g., with the boost pressure sensor or another suitable temperature sensor 53.
Using the controller 59, air mass flow into the engine system 21 is calculated as a function of the turbo speed, inlet pressure, and boost pressure. Using the controller 59, exhaust mass flow is calculated, such as by using the equation (1), above, as a function of the boost pressure, the engine intake temperature, volumetric efficiency of the engine, and engine size. EGR flow is then determined by subtracting air mass flow from exhaust mass flow.

Air mass flow according to the method can be calculated using the compressor map 63 that plots pressure ratio of the inlet pressure and the boost pressure for the compressor 27 versus air mass flow where a slope of a turbo speed line equals or exceeds a predetermined value, such as where the turbo speed line has a slope of −0.001. When the slope of the turbo speed line 61 is less than the predetermined value, reflecting operation of the compressor 27 close to the surge line, air mass flow is calculated via the surge region/flat line region map developed for the engine (or, typically, engine type) as a function of engine speed and torque.

Air mass flow according to the method can also or alternatively be calculated using the compressor map 63 when at least one of engine speed is greater than a predetermined value and engine torque is less than a predetermined percentage of maximum allowable torque, and via the surge region/flat line region map developed for the engine (or, typically, engine type) as a function of engine speed and torque when engine speed is less than or equal to a predetermined value and engine torque is equal to or greater than a predetermined percentage of maximum allowable torque.

In a method for controlling emissions from the engine system 21 according to an aspect of the present invention, upon measuring emissions from the engine system, such as via a NOx sensor in an exhaust after treatment system (EATS) 65, a signal can be sent from the NOx sensor to the controller 59. Depending upon the measured emissions from the engine system, the controller 59 can adjust EGR flow to adjust emissions in response to the measured emissions and the determined EGR flow. For example, typically, to reduce NOx emissions, EGR flow is increased from the determined EGR flow. This is typically accomplished by controlling, via the controller 59, the EGR valve 41 to further open. If measured emissions levels are within an acceptable range, the EGR flow might be reduced from the current determined EGR flow to a lower level by controlling, via the controller, the EGR valve 41 to close.

In the present application, the use of terms such as "including" is open-ended and is intended to have the same meaning as terms such as "comprising" and not preclude the presence of other structure, material, or acts. Similarly, though the use of terms such as "can" or "may" intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for measuring exhaust gas recirculation (EGR) flow in an engine system, the engine system comprising an engine, a turbocharger, the turbocharger including a compressor in an intake line upstream of the engine, an EGR line connected between an exhaust line downstream of the engine and the intake line upstream of the engine and downstream of the compressor, the method comprising:
  measuring turbo speed of the turbocharger;
  measuring inlet pressure upstream of the compressor;
  measuring boost pressure upstream of the engine;
  measuring engine intake temperature upstream of the engine;
  calculating air mass flow into the engine system as a function of the turbo speed, inlet pressure, and boost pressure;
  calculating exhaust mass flow as a function of the boost pressure, the engine intake temperature, volumetric efficiency of the engine, and engine size; and
  determining EGR flow by subtracting air mass flow from exhaust mass flow,
  wherein air mass flow is calculated using a compressor map that plots pressure ratio of the inlet pressure and the boost pressure for the compressor versus air mass flow where a slope of a turbo speed line equals or exceeds a predetermined value, and air mass flow is calculated as a function of engine speed and torque where the slope of the turbo speed line is less than the predetermined value.

2. The method as set forth in claim 1, wherein the engine comprises an intake manifold, and boost pressure and engine intake temperature are measured in the intake manifold.

3. The method as set forth in claim 1, wherein the predetermined value of the turbo speed line slope is −0.001.

4. A method for measuring exhaust gas recirculation (EGR) flow in an engine system, the engine system comprising an engine, a turbocharger, the turbocharger including a compressor in an intake line upstream of the engine, an EGR line connected between an exhaust line downstream of the engine and the intake line upstream of the engine and downstream of the compressor, the method comprising:
  measuring turbo speed of the turbocharger;
  measuring inlet pressure upstream of the compressor;
  measuring boost pressure upstream of the engine;
  measuring engine intake temperature upstream of the engine;
  calculating air mass flow into the engine system as a function of the turbo speed, inlet pressure, and boost pressure:
  calculating exhaust mass flow as a function of the boost pressure, the engine intake temperature, volumetric efficiency of the engine, and engine size; and
  determining EGR flow by subtracting air mass flow from exhaust mass flow, wherein air mass flow is calculated using a compressor map that plots pressure ratio of the inlet pressure and the boost pressure for the compressor versus air mass flow when at least one of engine speed is greater than a predetermined value and engine torque is less than a predetermined percentage of maximum allowable torque.

5. The method as set forth in claim 4, wherein air mass flow is calculated as a function of engine speed and engine torque when engine speed is less than or equal to a predetermined value and engine torque is equal to or greater than a predetermined percentage of maximum allowable torque.

6. A method for controlling emissions from an engine system, the engine system comprising an engine, a turbocharger, the turbocharger including a compressor in an intake line upstream of the engine, an exhaust gas recirculation (EGR) line connected between an exhaust line downstream of the engine and the intake line upstream of the engine and downstream of the compressor, the method comprising:
measuring emissions from the engine system;
determining EGR flow in the EGR line by
measuring turbo speed of the turbocharger,
measuring inlet pressure upstream of the compressor,
measuring boost pressure upstream of the engine,
measuring engine intake temperature upstream of the engine,
calculating air mass flow into the engine system as a function of the turbo speed, inlet pressure, and boost pressure,
calculating exhaust mass flow as a function of the boost pressure, the engine intake temperature, volumetric efficiency of the engine, and engine size, and
determining EGR flow by subtracting air mass flow from exhaust mass flow; and
adjusting EGR flow to adjust emissions in response to the measured emissions and the determined EGR flow,
wherein air mass flow is calculated using a compressor map that plots pressure ratio of the inlet pressure and the boost pressure for the compressor versus air mass flow where a slope of a turbo speed line equals or exceeds a predetermined value, and air mass flow is calculated as a function of engine speed and torque where the slope of the turbo speed line is less than the predetermined value.

7. The method as set forth in claim 6, wherein the engine comprises an intake manifold, and boost pressure and engine intake temperature are measured in the intake manifold.

8. The method as set forth in claim 6, wherein air mass flow is calculated using a compressor map that plots pressure ratio of the inlet pressure and the boost pressure for the compressor versus air mass flow where a slope of a turbo speed line equals or exceeds a predetermined value.

9. The method as set forth in claim 8, wherein the predetermined value of the turbo speed line slope of −0.001.

10. The method as set forth in claim 8, wherein air mass flow is calculated as a function of engine speed and torque where the slope of the turbo speed line is less than the predetermined value.

11. The method as set forth in claim 4, comprising measuring NOx emissions from the engine system and adjusting EGR flow by increasing EGR flow from determined EGR flow to reduce NOx emissions.

12. An engine system, comprising:
an engine,
a turbocharger, the turbocharger including a compressor in an intake line upstream of the engine;
an exhaust gas recirculation (EGR) line connected between an exhaust line downstream of the engine and the intake line upstream of the engine and downstream of the compressor, the EGR line including an EGR valve;
a turbo speed sensor configured to measure turbo speed of the turbocharger;
a pressure sensor configured to measure inlet pressure upstream of the compressor;
a boost pressure sensor configured to measure pressure upstream of the engine;
a temperature sensor configured to measure engine intake temperature upstream of the engine;
a controller configured to calculate air mass flow into the engine system as a function of the turbo speed, inlet pressure, and boost pressure, to calculate exhaust mass flow as a function of the boost pressure, the engine intake temperature, volumetric efficiency of the engine, and engine size, and to determine EGR flow by subtracting air mass flow from exhaust mass flow, and to control opening and closing of the EGR valve to obtain a desired level of EGR flow; and
an engine speed sensor for measuring engine speed, and a torque sensor for measuring engine torque, and wherein the controller is configured to calculate air mass flow using a compressor map that plots pressure ratio of the inlet pressure and the boost pressure for the compressor versus air mass flow when at least one of engine speed is greater than a predetermined value and engine torque is less than a predetermined percentage of maximum allowable torque.

13. The engine system as set forth in claim 12, wherein the predetermined value of the turbo speed line slope of −0.001.

14. The engine system as set forth in claim 12, wherein the controller is configured to calculate air mass flow as a function of engine speed and torque where the slope of the turbo speed line is less than the predetermined value.

15. The engine system as set forth in claim 12, wherein the controller is configured to calculate air mass flow as a function of engine speed and engine torque when engine speed is less than or equal to a predetermined value and engine torque is equal to greater than a predetermined percentage of maximum allowable torque.

* * * * *